United States Patent [19]

Noritake et al.

[11] Patent Number: 5,773,126
[45] Date of Patent: Jun. 30, 1998

[54] COMPOSITE FILM HAVING A SURFACE SLIP PROPERTY

[75] Inventors: Yugo Noritake; Toru Sakamoto; Yasuo Nakai, all of Tokyo-To, Japan

[73] Assignee: Dai Nippon Printing Co., Ltd., Japan

[21] Appl. No.: 696,881

[22] PCT Filed: Dec. 22, 1995

[86] PCT No.: PCT/JP95/02634

§ 371 Date: Nov. 1, 1996

§ 102(e) Date: Nov. 1, 1996

[87] PCT Pub. No.: WO96/19345

PCT Pub. Date: Jun. 27, 1996

[30] Foreign Application Priority Data

Dec. 22, 1994 [JP] Japan ..................................... 6-335379
Jan. 9, 1995 [JP] Japan ..................................... 7-016370

[51] Int. Cl.[6] ............................. G02B 1/10; B32B 54/02; B32B 3/26
[52] U.S. Cl. .......................... 428/143; 428/141; 428/156; 359/483; 359/493; 359/580; 359/581; 359/582; 359/601
[58] Field of Search .................................. 428/141, 143, 428/156; 359/483, 493, 580, 581, 582, 601

[56] References Cited

U.S. PATENT DOCUMENTS

| | | | |
|---|---|---|---|
| 4,318,958 | 3/1982 | Piatt | 428/332 |
| 4,473,277 | 9/1984 | Brown | 350/399 |
| 4,485,123 | 11/1984 | Troue | 427/54.1 |
| 4,568,598 | 2/1986 | Bilkadi et al. | 428/141 |
| 4,604,297 | 8/1986 | Liu | 427/64 |
| 4,694,218 | 9/1987 | Chao | 313/478 |
| 5,124,184 | 6/1992 | Wong | 428/141 |
| 5,178,955 | 1/1993 | Aharoni et al. | 428/421 |
| 5,387,463 | 2/1995 | Nakamura et al. | 428/327 |
| 5,425,848 | 6/1995 | Haisma et al. | 216/48 |
| 5,456,747 | 10/1995 | Ibbotson | 106/178 |

FOREIGN PATENT DOCUMENTS

| | | |
|---|---|---|
| 63-298201 | 12/1988 | Japan . |
| 6446702 | 2/1989 | Japan . |
| 2-289892 | 11/1990 | Japan . |
| 3-120037 | 5/1991 | Japan . |
| 3-296469 | 12/1991 | Japan . |
| 4-249145 | 9/1992 | Japan . |
| 5-196808 | 8/1993 | Japan . |
| 0606851 | 1/1994 | Japan . |

Primary Examiner—William P. Watkins, III
Attorney, Agent, or Firm—Parkhurst & Wendel, L.L.P

[57] ABSTRACT

A composite film that, when used as a protective film or an antireflection film for e.g., a polarizing film of a liquid crystal display, has a surface slip property good enough to be rolled and excellent mechanical and chemical resistance and optical properties. In one aspect, the composite film has a substrate film and a hard coat layer provided on the substrate film, the hard coat layer formed of an ionizing radiation-cured resin, the surface of the hard coat layer having fine irregularities serving to create a surface slip property. In another aspect, the composite film has a substrate film and a hard coat layer provided on the substrate film, the hard coat layer formed of a composition comprising an ionizing radiation-cured resin, fine particulates of inorganic and/or organic materials, and an organic silicone.

10 Claims, 2 Drawing Sheets

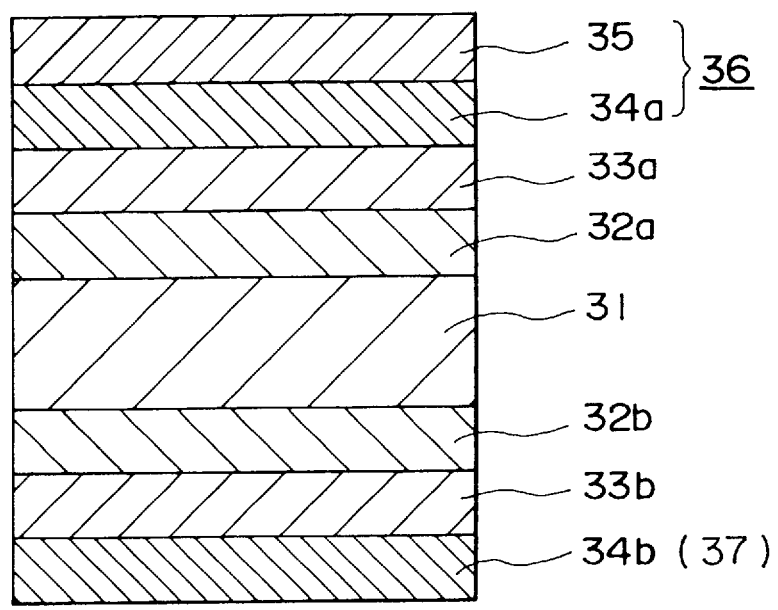
F I G. 3

COMPOSITE FILM HAVING A SURFACE SLIP PROPERTY

BACKGROUND OF THE INVENTION

The present invention relates to a composite film suitable for use, for example, as a surface film for various displays, such as CRT displays, liquid crystal displays, and plasma displays, as a cover film for optical lenses, such as transparent plastics, sunglasses, eyeglass lenses, and finder lenses for cameras and for various instruments and gauges, as a surface antireflection film for window glasses of automobiles, electric railcars and the like, and as a protective film for the surface of a polarizing plate (film) on the back light side of liquid crystal displays.

More particularly, the present invention relates to a composite film excellent in both surface slip properties and surface protective properties.

A conventional polarizing film is generally formed by adsorbing iodine or a dichroic dye onto a stretched and aligned film for a polarizing membrane to prepare a polarizing membrane having a polarizing property and providing a protective film on both surfaces of the polarizing membrane.

A film of polyvinyl alcohol or a derivative thereof is used as the polarizing membrane, while a non-aligned film of a cellulose acetate resin or an acrylic resin is used as the protective film for the polarizing membrane. The protective film is formed by lamination of a film or by coating of a liquid resin. Further, sealing of a polarizing film into a protective film in a bag form has also been proposed in the art.

The polarizing film thus obtained is used mainly in liquid crystal display members and, further, in decorative members and films for removing reflected light. In particular, a polarizing film using a polyvinyl alcohol-iodine membrane as the polarizing membrane with a triacetyl cellulose film (hereinafter often referred to as a "TAC film") being used as the protective film has been extensively used because it has excellent optical properties, exhibits high polarization in a wide wavelength range, and, at the same time, is excellent in brightness and contrast.

Further, in the above polarizing film, a hard coat layer is further provided on the TAC film as the protective film in order to further improve the scratch resistance and chemical resistance of the surface of the film.

The polarizing film bearing the above hard coat layer has acceptable properties as a final product. It, however, has various problems, to be solved, associated with production process and some performance requirements.

For example, in the actual production process, as compared with the lamination of a TAC film onto a polarizing membrane followed by coating of a hard coat layer, the lamination of a TAC film with a hard coat layer coated thereon is preferred from the viewpoint of producing products having a higher quality in a better yield with a higher efficiency.

However, when a hard coat layer, which inherently has high smoothness, is formed by coating on the TAC film, both the surface of the hard coat layer and the back surface of the TAC film are smooth, offering good adhesion. Therefore, the film with a hard coat layer formed thereon has very poor surface slip properties.

When the film with the above hard coat layer coated thereon is rolled, uneven deformation called "crater" or "pyramid" is created in a part of the film, which is causative of an inefficient process and a lowered yield.

The creation of "craters" and "pyramids" is known to be attributable to mutual adhesion between films during winding. In order to prevent such a problem, a method has been proposed wherein a hard coat layer is formed from a coating liquid containing an extender pigment, such as silica, and/or organic polymer beads to render the surface of the coating matte. This method, however, is disadvantageous in that a part of the matting material precipitates on the surface of the hard coat layer, resulting in deteriorated chemical resistance and that since the matting material cannot be evenly dispersed in the coating liquid, an even coating cannot be formed and, in the case of curing of the coating by ultraviolet irradiation, a hard coat layer having desired surface hardness cannot be provided due to inhibition of curing by oxygen.

In view of the above problems, the present invention has been made, and an object of the present invention is to provide a composite film which has a satisfactorily good surface slip property to effectively prevent the problem of adhesion causative of the creation of craters and pyramids and, at the same time, is excellent in resistance and optical properties.

DISCLOSURE OF INVENTION

In order to attain the above object, the composite film according to the first invention is characterized by comprising: a substrate film; and a hard coat layer provided on the substrate film, the hard coat layer being formed of an ionizing radiation-cured resin, the surface of the hard coat layer having fine irregularities serving to create a surface slip property.

According to a preferred embodiment of the present invention, the fine irregularities satisfy requirements of surface center line average height Ra 0.06 to 0.7 $\mu$m, average irregularity pitch Sm 1000 to 3000 $\mu$m, and haze of resin layer less than 1.0%.

The composite film according to the second invention is characterized by having a slippery surface and comprising: a substrate film; and a hard coat layer provided on the substrate film, the hard coat layer being formed of a composition comprising an ionizing radiation-cured resin, fine particles of inorganic and/or organic materials, and an organic silicone.

BRIEF DESCRIPTION OF THE DRAWINGS

FIG. 3 is a cross-sectional view showing an embodiment of a liquid crystal display device to which the composite film of the present invention has been applied.

BEST MODE FOR CARRYING OUT THE INVENTION

First Invention

Figure 1A:
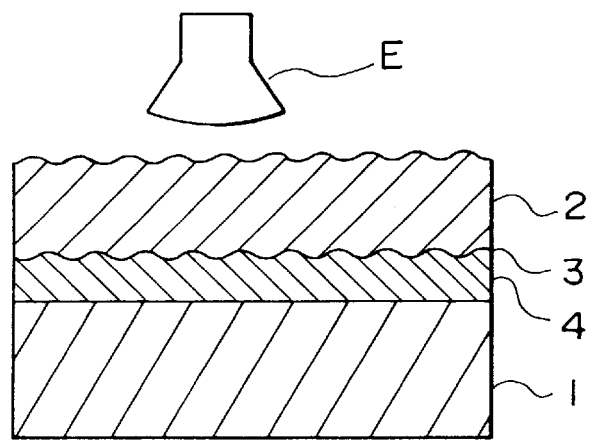
FIGS. 1A and 1B are cross-sectional views showing steps of producing a composite film according to a first embodiment of the present invention.
Figure 1B:
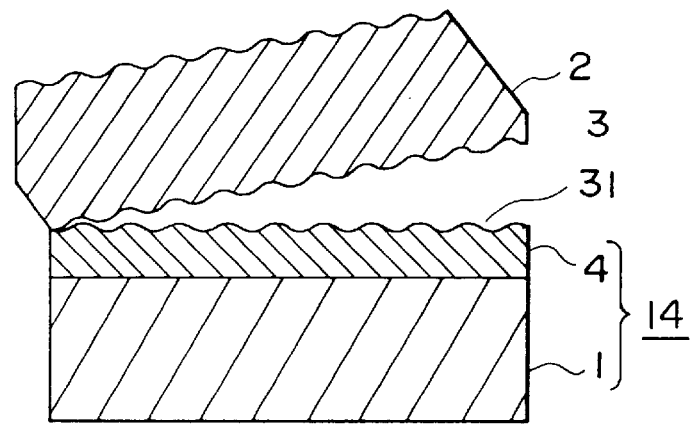

The first invention relates to a composite film 14 as shown in FIG. 1B. The composite film 14 comprises a substrate film 1, a hard coat layer 4, formed of an ionizing radiation-cured resin, provided on the surface of the substrate film 1, with a slip portion 31 having an irregularity pattern (fine irregularities) 3 formed on the surface thereof. The irregularity pattern corresponds to that previously provided on an embossing film 2.

The substrate film used in the present invention constitutes a protective layer for a polarizing membrane and may be selected from films having excellent total light transmittance and low haze, and examples of such films include polymethylpentene, cellulose triacetate, cellulose diacetate, polymethyl methacrylate, polystyrene, polyvinyl chloride, polycarbonate, and polyvinyl butyral films.

In general, a TAC film produced by casting is preferably used, and the film may contain 3 to 10% by weight of a plasticizer such as a phosphoric ester. There is no particular limitation also on the thickness of the substrate film. When the composite film is used as a protective film for a polarizing film in a liquid crystal display, however, the thickness is, in general, preferably in the range of from 75 to 100 $\mu$m although it varies depending upon properties of the substrate film, such as rigidity.

A suitable compound used in the hard coat layer according to the present invention may be selected from conventional resins, for a hard coat layer, such as various acrylic resins and siloxane resins. Curing for the formation of the hard coat layer may be performed, for example, by taking advantage of ultraviolet light, electron beams, or heating. Use of an ionizing radiation-curable resin which can be cured by ultraviolet light or electron beams is preferred from the viewpoint of good workability. The ionizing radiation-curable resin is generally in the form of a composition constituted by a suitable mixture of a prepolymer, an oligomer and/or a monomer having in its molecule a polymerizable unsaturated bond or an epoxy group, for example, a composition comprising an acrylate resin, such as a urethane acrylate, a polyester acrylate, or an epoxy acrylate, and a silicone resin, such as a siloxane.

When the ionizing radiation-curable resin composition is reacted and cured by ultraviolet irradiation, it is possible to incorporate, into the ionizing radiation-curable resin composition, a suitable photopolymerization initiator, selected from acetophenone compounds, benzophenone compounds, Michler's benzoylbenzoate, α-amyloxime esters, tetramethyl thiuram monosulfide, and thioxanthones and, if necessary, a photosensitizer, such as n-butylamine, triethylamine, or tri-n-butylphosphine.

The coverage of the hard coat layer formed by using such a resin composition as a coating liquid is preferably in the range of from 3 to 20 g/m$^2$ (solid content). When the coverage is less than 3 g/m$^2$, the scratch resistance is unsatisfactory. Further, in this case, the formation of an agglomerate in the coating liquid often results in the creation of unfavorable fine defects on the coated surface.

A coverage exceeding 20 g/m$^2$ is unnecessary and, rather, is likely to result in increased haze, lowered light transmittance, and curling of the film and, in addition, is disadvantageous from the viewpoint of cost.

The embossing film having an irregularity pattern for forming the slip portion may be any film which has no adverse effect on the application of an ionizing radiation. Preferred is a transparent, heat-resistant film with an irregularity pattern of surface center line average height Ra 0.06 to 0.7 $\mu$m and average irregularity pitch Sm 1000 to 3000 $\mu$m being formed thereon. A suitable film may be selected from, for example, films of a polyester, a polyamide, a saponified ethylene/vinyl acetate copolymer, and polymethylpentene. Among others, a stretched film of polyethylene terephthalate is preferred from the viewpoint of excellent transparency and heat residence. The thickness of the embossing film is preferably 15 to 38 $\mu$m from the viewpoint of workability.

Regarding the irregularity pattern provided in the embossing film, the embossing film may not be necessarily a matte film having irregularities formed by means of a special die but a film which somewhat lacks transparency and has a very fine irregularity pattern considered to be spontaneously created by the step of cooling or by the influence of impurities or the like in the production of the film.

A coating liquid of the ionizing radiation-curable resin is coated on the substrate film, and the coated substrate film and the embossing film are laminated on top of the other so that the uncured coating faced the irregularity pattern. The laminate is irradiated with an ionizing radiation to cure the resin, and the embossing film is removed from the laminated resin, to provide a slip film having a hard coat layer with a slip portion formed therein.

In the composite film wherein a slip layer constituted by an irregularity pattern of an ionizing radiation-cured resin is provided on a substrate film, the contact area between the slip portion and the non-coated surface is reduced. Therefore, the slip layer functions to create a slip property of preferably not more than 0.8, more preferably not more than 0.5, in terms of the coefficient of friction between the slip portion and the non-coated surface.

Further, when the irregularities are provided to have surface center line average height Ra 0.6 to 0.3 $\mu$m and average irregularity pitch Sm 1000 to 3000 $\mu$m, a haze of less than 1.0% can be maintained without sacrificing the transparency of the substrate film.

The formation of the slip portion of an ionizing radiation-cured resin by using an embossing film can eliminate the inhibition of curing by oxygen, enables the irregularity pattern to be evenly formed, and can provide a composite film which is free from lowering in scratch resistance and transparency and has an even slip property between the top surface and the back surface of the film.

Further, when the composite film is produced in a roll form, the creation of uneven deformation, such as "craters" and "pyramids," can effectively be prevented.

Second Invention

The composite film according to the second invention is characterized by having a slippery surface and comprising: a substrate film; and a hard coat layer provided on the substrate film, the hard coat layer being formed of a composition comprising an ionizing radiation-curable resin, fine particles of inorganic and/or organic materials, and an organic silicone.

The substrate film used in this embodiment is preferably a triacetyl cellulose film (a TAC film). In this case, the TAC film is not particularly limited. In general, however, it is one produced by casting and contains 3 to 10% by weight of a plasticizer such as a phosphoric ester. There is no particular limitation also on the thickness of the substrate film. When the composite film is used as a protective film for a polarizing film in a liquid crystal display (LCD), however, the thickness of the substrate film is generally about 80 $\mu$m.

In the present invention, the resin used for constituting the hard coat layer is an ionizing radiation-curable resin, and conventional resins, for a hard coat layer, such as various acrylic resins and siloxane resins may be used for this purpose. Curing for the formation of the hard coat layer may be performed by any of UV (ultraviolet light) curing and EB (electron beam) curing. Such an ionizing radiation-curable resin is generally in the form of a composition constituted by a suitable mixture of a prepolymer, an oligomer and/or a monomer having in its molecule a polymerizable unsaturated bond or an epoxy group, for example, a composition comprising an acrylate resin, such as a urethane acrylate, a polyester acrylate, or an epoxy acrylate, a silicone resin, such as a siloxane, a polyester, an epoxy resin and the like.

When an electron beam is used for the curing, the above ionizing radiation-curable resin composition as such may be used. On the other hand, when the ionizing radiation-curable resin composition is reacted and cured by ultraviolet irradiation, it is possible to incorporate, into the ionizing radiation-curable resin composition, a suitable photopolymerization initiator, selected from acetophenone compounds, benzophenone compounds, Michler's benzoylbenzoate, α-amyloxime esters, tetramethyl thiuram monosulfide, and thioxanthones, and, if necessary, a photosensitizer, such as n-butylamine, triethylamine, or tri-n-butylphosphine.

In the present invention, particles of inorganic and/or organic materials incorporated into the above resin appear on the surface of coating in the formation of the hard coat layer and function to reduce the contact area between the hard coat layer and the TAC film during winding and to impart a slip property. For this reason, the inorganic material is preferably silica or alumina because it is less likely to deteriorate the transparency. On the other hand, particles of acrylic resin, styrene resin, urethane resin, polycarbonate, nylon and the like may be used as particles of the organic material.

The average particle diameter of these particles is preferably 1±0.5 μm, and the amount of the particles added may be generally up to about 1 part by weight based on 100 parts by weight of the resin. When the particles are added in an amount of about 1 part by weight, the following matter should be noted. In the stage of coating of the hard coat layer, the slip property is good and the haze also is good and not more than 1%. As described above, however, the saponification as the post-treatment increases the haze to a value exceeding 1%, rendering the resultant composite film unsuitable for some applications due to deteriorated optical properties. Therefore, in the present invention, the amount of the fine particles added is limited to 0.3 to 0.8 parts by weight, and a lack in slip property caused by the reduction in amount of the fine particles added is compensated for by adding an organic silicone in an amount in the range of from 0.02 to 0.2 parts by weight. This constitution offers a suitable slip property (a coefficient of friction of not more than 0.8, more preferably not more then 0.5) and, at the same time, excellent optical properties.

In the present invention, the organic silicone to be incorporated, together with the particles of inorganic and/or organic materials, into the ionizing radiation-cured resin constituting the hard coat layer is a silicone oil which may be in an oil form or of reaction curing type.

Various modified silicones, for example, epoxy-modified, amino-modified, carboxyl-modified, alkyl-modified, hydroxyl-modified, and polyether-modified silicone oils may be used. They may be used alone or as a mixture of two or more.

The amount of the organic silicone added is preferably about 0.02 to 0.2 parts by weight based on 100 parts by weight of the resin constituting the hard coat layer. When the amount of the organic silicone added is less than 0.02 parts by weight, no satisfactory auxiliary effect regarding the slip property can be attained, while the addition of the organic silicone in an amount exceeding 0.2 parts by weight offers no further improvement in slip property and, hence, is wasteful and, in addition, rather is likely to unfavorably result in increased haze upon saponification after the coating of the hard coat layer.

The coverage of the hard coat layer formed using the above resin composition is preferably in the range of from 7 to 30 $g/m^2$, more preferably in the range of from 7 to 20 $g/m^2$, although it varies depending upon the diameter of the particles added. The hard coat layer can be formed even at a coverage of less than 7 $g/m^2$. In this case, however, if the agglomeration of the particles occurs, fine defects are unfavorably created on the coated surface. A coverage exceeding 30 $g/m^2$ is unnecessary and, rather, is likely to result in increased haze and lowered light transmittance and, in addition, disadvantageous from the viewpoint of cost.

According to the second invention, the above constitution offers the following excellent effects. The coating of the ionizing radiation-cured resin imparts protective properties, such as scratch resistance and chemical resistance, and the fine particles of the inorganic and/or organic materials and the organic silicone act together in a synergistic fashion to improve the slip property between the top surface and the back surface of the composite film, enabling the film to be rolled without creating any uneven deformation. Further, the use of the organic silicone in combination with the fine particles of the inorganic and/or organic materials can reduce the amount of the fine particles of the inorganic and/or organic materials added, advantageously reducing the lowering in optical properties such as haze.

Further, according to a preferred embodiment of the present invention, the hard coat layer comprises 100 parts by weight of an ionizing radiation-cured resin, 0.3 to 0.8 parts by weight of particles, of inorganic and/or organic materials, having an average particle diameter of 1±0.5 μm, and 0.02 to 0.2 parts by weight of an organic silicone. This constitution more surely offers protective properties and slip properties of the clear hard coat film, eliminates inefficiency of the process attributable to the creation of uneven deformation or the like, causes no increase in haze or the like even after the saponification as the post-treatment enabling excellent optical properties to be maintained.

When the hard coat layer is provided at a coverage in the range of from 7 to 30 $g/m^2$ on a solid basis after curing, agglomeration of fine particles incorporated into the hard coat layer creates no particulate defects in the coating, providing a composite film which surely exhibits good slip properties, causes no uneven deformation at the time of winding, has good post-processability and possess excellent stable protective properties and optical properties.

FIG. 3 is a cross-sectional view of an embodiment of a liquid crystal display device to which the composite film of the present invention has been applied. In this embodiment, polarizing elements 33a and 33b are laminated on respective surfaces of a liquid crystal display device 31 through substrates 33a and 33b, and composite films 34a and 34b according to the present invention are further laminated thereonto. In this case, the composite film 34a, together with a thin-film layer 35 of a metal, constitutes an antireflection sheet 36, while the composite film 34b functions as a protective film.

The present invention will now be described in more detail with reference to the following examples.

EXAMPLE A1

As shown in FIGS. 1A and 1B, an ultraviolet-curable resin (40-13S, manufactured by Dainichiseika Colour & Chemicals Mfg. Co., Ltd., Japan) to serve as a hard coat layer 4 was roll-coated at a coverage of 7 $g/m^2$ (solid content) onto one surface of a rolled 80 μm-thick TAC film (FT-UV80, manufactured by Fuji Photo Film Co., Ltd., Japan) as a substrate 1, and an embossing film 2 of 25 μm-thick S-PET (manufactured by Toray Industries, Inc.) was laminated on the coated substrate film so that the uncured coating came into contact with an irregularity pattern 3 provided on the S-PET. The laminate was exposed to ultraviolet irradiation equipment (two high-pressure mercury lamps (output 160 W/cm for each lamp); distance 10 cm) at a speed of 10 m/min to cure the coating, and the embossing film 2 was then removed from the laminate to prepare a roll of a slip film 14 with a slip portion 31 provided in a hard coat layer 4.

COMPARATIVE EXAMPLE A1

A comparative film was prepared in the same manner as in Example A1, except that the hard coat layer 4 was formed without lamination of the embossing film onto the TAC film 1.

The rolls prepared in the example and the comparative example was evaluated for the following items. The results are tabulated in Table 1.

(1) Total light transmittance: measured according to JIS K-7105
(2) Haze: measured according to JIS K-7105
(3) Coefficient of static friction: measured in terms of coefficient of static friction between the TAC film and the hard coat. In the measurement, the film was mounted so that the TAC film faced on a sled side with the hard coat layer facing on a slantable plate. Coefficient of static friction $\mu_0 = \tan\theta$ wherein $\theta$ represents an angle at which the sled begins to slip when the slantable plate is slanted at a slanting rate of 2.70 sec (an angle of friction or an angle of repose). The weight of the sled: 1 Kg.
(4) Chemical resistance: The sample was immersed in an 8% aqueous sodium hydroxide solution at 60° C. for 90 sec, and a change in the hard coat layer was visually inspected.
(5) Surface hardness: measured in terms of pencil hardness under a load of 1000 g.
(6) Surface roughness: measured in terms of center line average roughness Ra and average irregularity pitch Sm according to JIS B0601.
(7) Rolled state: The surface state of a 1500-m roll was visually evaluated.

TABLE A1

| | (Results) | |
|---|---|---|
| Evaluation item | Example | Comparative Example |
| Total light transmittance (%) (Reference value: not less than 90%) | 90.5 | 91.3 |
| Haze (%) (Reference value: not more than 1%) | 0.9 | 0.9 |
| Coefficient of static friction (Reference value: not more than 0.8%) | 0.5 | 1.8 |
| Chemical resistance | Not changed | Not changed |
| Surface hardness | 2H | H |
| Surface roughness: Ra μm | 0.072 | — |
| Average pitch: Sm μm | 1765 | — |
| Surface state of roll: 1500-m roll | Good without deformation | Many pyramids created |

As is apparent from the evaluation results tabulated in Table A1, the comparative film had good optical properties. However, the coefficient of static friction was so large that uneven deformation such as pyramid or crater was created in the rolled state.

By contrast, the film of the example was good without deformation in the rolled state by virtue of reduction in coefficient of static friction by the slip portion provided in the hard coat layer.

As is apparent from the foregoing detailed description, the slip film according to the present invention had excellent hardness and chemical resistance, optical properties represented by a total light transmittance of not less than 90% and a haze of not more than 1%, a good slip property, that is, a coefficient of static friction of not more than 0.5 between the top surface and the back surface of the slip film, and, when rolled, was free from uneven deformation, such as craters and pyramids, offering good productivity.

EXAMPLE B

Figure 2:
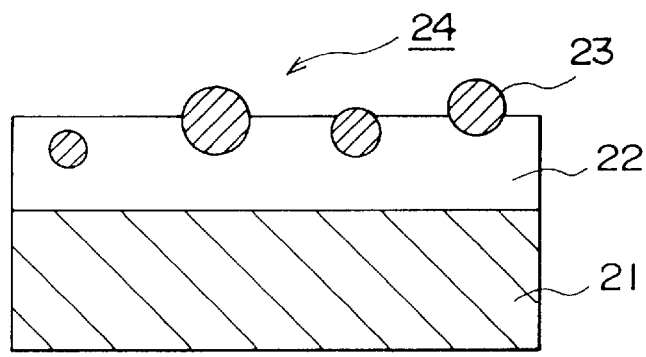
FIG. 2 is a cross-sectional view of a composite film according to a second embodiment of the present invention.

FIG. 2 is a schematic cross-sectional view showing the construction of an embodiment of the composite film according to the second invention.

In FIG. 2, a clear hard coat film 24 comprises a TAC film 21 and a hard coat layer 22 provided on one surface of the TAC film 21, the hard coat layer 22 being formed of an ionizing radiation-cured resin with inorganic and/or organic particles 23 and an organic silicone (not shown) incorporated therein. The hard coat layer 22 is formed so that the inorganic and/or organic particles 23 and the organic silicone contained in the hard coat layer 22 is floated on the surface thereof, resulting in improved slip property between the top surface and the back surface of the clear hard coat film 24.

EXAMPLE B1 TO B4 AND COMPARATIVE EXAMPLES B1 AND B2

Coating liquids, for a hard coat layer, having compositions (Examples B1 to B4 and Comparative Examples B1 and B2) specified in Table B1 were coated at a coverage (after drying and curing) of 9 g/m² onto one surface of a rolled 80 μm-thick TAC film (FT-UV80, manufactured by Fuji Photo Film Co., Ltd.) by means of a roll coater provided with a hot-air drier and an ultraviolet irradiation equipment. The solvent was removed by hot-air drying, and the coated films were passed through the ultraviolet irradiation equipment (two high-pressure mercury lamps (output 160 W/cm for each lamp); distance 10 cm) at a line speed of 10 m/min to cure the coatings and then rolled to prepare rolled clear hard coat films of Examples B1 to B4 and Comparative Examples B1 and B2.

| Compositions of coating liquids for hard coat layers of examples and comparative examples | | |
| --- | --- | --- |
| (1) Ultraviolet-curable resin (polyester acrylate resins) [Seika Beam (containing a photopolymerization initiator), manufactured by Dainichiseika Colour & Chemicals Mfg. Co., Ltd.] | 100 parts by weight | |
| (2) Silica powder (average particle diameter 1 μm) | 0 to 0.8 parts by weight | |
| (3) Polyether-modified silicone | 0 to 0.2 parts by weight | |
| (4) Diluting solvent (toluene) | 120 parts by weight | |

TABLE B1

(Compositions of coating liquids for hard coat layer)

| | UV-curable resin (parts) | Silica powder (parts) | Silicone (parts) | Solvent Toluene (parts) |
| --- | --- | --- | --- | --- |
| Ex. B1 | 100 | 0.8 | 0.02 | 120 |
| Ex. B2 | 100 | 0.7 | 0.05 | 120 |
| Ex. B3 | 100 | 0.7 | 0.10 | 120 |
| Ex. B4 | 100 | 0.3 | 0.20 | 120 |
| Comp. Ex. B1 | 100 | 0 | 0.20 | 120 |
| Comp. Ex. B2 | 100 | 0.5 | 0 | 120 |

Note:
In Table B1, "parts" is by weight.

[EVALUATION AND RESULTS]

The clear hard coat films prepared in Examples B1 to B4 and Comparative Examples B1 and B2 were used as samples to conduct evaluation for the following items. The results are tabulated in Table 2.

(1) Haze (%) of each sample clear hard coat film (before saponification)

Measuring method: measured, with a direct-reading haze meter, manufactured by Toyo Seiki Seisaku Sho, Ltd., according to JIS K-7105.

(2) Haze (%) of each sample clear hard coat film after saponification

Measuring method: measured, with a direct-reading haze meter, manufactured by Toyo Seiki Seisaku Sho, Ltd., according to JIS K-7105.

The saponification was carried out by the following method.

A 2N aqueous KOH solution heated at 60° C. was placed in a circulation tank, and, while circulating the solution, each sample film was immersed in the solution for 90 sec, thereby saponifying each film. The films were then washed with running water and dried in a hot-air drier at 60° C. for 60 sec, thereby completing the saponification.

(3) Coefficient of static friction

Measuring method: The coefficient of static friction between the surface of the TAC film and the surface of the hard coat was measured with an AN type friction meter manufactured by Toyo Seiki Seisaku Sho, Ltd.

In the measurement, each sample film was mounted so that the TAC film faced on a sled side with the hard coat layer facing on a slantable plate.

Coefficient of static friction $\mu_0 = \tan \theta$ wherein θ represents an angle at which the sled begins to slip when the slantable plate is slanted at a slanting rate of 2.70°/sec (an angle of friction or an angle of repose). The weight of the sled: 1 Kg.

(4) Evaluation of the state of roll at the time of winding after clear hard coating Each roll of the samples was visually inspected for uneven deformation such as the so-called "craters" and "pyramids," and whether the rolls are acceptable or unacceptable was judged based on the results.

TABLE B2

(Results)

| | Haze (%) (reference value: not more than 1%) | | Coefficient of static friction (reference value: not more than 0.8) | State of roll at the time of winding (presence or absence of uneven deformation (such as craters and/or pyramids) |
| --- | --- | --- | --- | --- |
| | Before saponification | After saponification | | |
| Ex. B1 | 0.4 | 0.6 | 0.61 | Good without deformation |
| Ex. B2 | 0.3 | 0.6 | 0.47 | Good without deformation |
| Ex. B3 | 0.4 | 1.0 | 0.33 | Good without deformation |
| Ex. B4 | 0.4 | 1.0 | 0.70 | Substantially good |
| Comp. Ex. B1 | 0.2 | 0.2 | 1.30 | Severely deformed and unacceptable |
| Comp. Ex. B2 | 0.3 | 0.5 | 0.91 | Somewhat deformed and unacceptable |

As is apparent from the results summarized in Table B2, for the clear hard coat films of Examples B1 to B4, the haze was good, that is, not more than 1% both before and after the saponification, and the coefficient of static friction was not more than the reference value (not more than 0.8), indicating that the clear hard coat films have a good slip property. Further, the roll at the time of winding was also good without creating any uneven deformation. By contrast, for the clear hard coat films of Comparative Examples B1 and B2, the haze was good and low both before and after the saponification. However, the coefficient of static friction was large and exceeded the reference value 0.8, indicating that the films have an unsatisfactory slip property. Due to the unsatisfactory slip property, the comparative films created uneven deformation such as "craters" and/or "pyramids," rendering these films unsuitable for practical use.

As is apparent also from the results of the examples and the comparative examples, the present invention can provide a clear hard coat film which is excellent in protective properties, such as scratch resistance and chemical resistance, and, when subjected to saponification as a post-treatment, exhibits only minimized increase in haze, that is, has excellent optical properties, and, in addition, has an excellent slip property between the top surface and the back surface of the film and, hence, when rolled, causes no uneven deformation and has excellent processability.

We claim:

1. A composite film comprising:

a substrate film; and a coat layer, provided on said substrate film, having a coefficient of static friction of no more than 0.8 and a haze less than 1.0%, and formed of an ionizing radiation-cured resin, the surface of said coat layer having fine irregularities with a surface center line average height Ra of 0.06 to 0.7 μm and average irregularity pitch Sm of 1000 to 3000 μm.

2. The composite film according to claim 1, wherein the substrate film is a film selected from the group consisting of polymethylpentene, cellulose triacetate, cellulose diacetate, polymethyl methacrylate, polystyrene, polyvinyl chloride, polycarbonate, and polyvinyl butyral films.

3. The composite film according to claim 1, wherein the fine irregularities have been created by using an embossing film.

4. The composite film according to claim 1, which is laminated onto the surface of a polarizing plate of a liquid crystal display.

5. The composite film of claim 1, wherein said ionizing radiation-cured resin is an acrylic resin or a siloxane resin.

6. A composite film comprising:

a substrate film; and a coat layer, provided on said substrate film, formed of a composition comprising 100 parts by weight of an ionizing radiation-curable resin, 0.3 to 0.8 parts by weight of fine particles having an average particle diameter of 1±0.5 μm, and 0.02 to 0.2 parts by weight of an organic silicone, the coverage of the composition for said coat layer being in the range of from 7 to 30 g/m$^2$ on a solid basis after curing, and the surface of said coat layer having a coefficient of static friction of no more than 0.8.

7. The composite film according to claim 6, wherein the substrate film is a film selected from the group consisting of polymethylpentene, cellulose triacetate, cellulose diacetate, polymethyl methacrylate, polystyrene, polyvinyl chloride, polycarbonate, and polyvinyl butyral films.

8. The composite film according to claim 6, which is laminated onto the surface of a polarizing plate of a liquid crystal display.

9. The composite film of claim 6, wherein said ionizing radiation-cured resin is an acrylic resin or a siloxane resin.

10. The composite film of claim 6, wherein said organic silicone is selected from the group consisting of an epoxy-modified silicone oil, an amino-modified silicone oil, a carboxyl-modified silicone oil, an alkyl-modified silicone oil, an hydroxyl-modified silicone oil, a polyether-modified silicone oil, and mixtures thereof.

* * * * *